United States Patent
Yoshida et al.

(10) Patent No.: US 6,770,996 B2
(45) Date of Patent: Aug. 3, 2004

(54) ROTARY ELECTRIC MACHINE WITH STATOR ELASTIC SUPPORT STRUCTURE

(75) Inventors: Ko Yoshida, Nagoya (JP); Tsutomu Shiga, Nukata-gun (JP); Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 135 days.

(21) Appl. No.: 10/341,415

(22) Filed: Jan. 14, 2003

(65) Prior Publication Data

US 2003/0102750 A1 Jun. 5, 2003

Related U.S. Application Data

(62) Division of application No. 09/740,038, filed on Dec. 20, 2000, now abandoned.

(30) Foreign Application Priority Data

Dec. 20, 1999  (JP) ............................................ 11-360967

(51) Int. Cl.[7] ................................................. H02K 5/00
(52) U.S. Cl. .............................. 310/91; 310/51; 310/89; 310/201
(58) Field of Search ................................ 310/89, 91, 43, 310/45, 58, 201, 206, 208, 258–260, 218

(56) References Cited

U.S. PATENT DOCUMENTS

| | | | |
|---|---|---|---|
| 4,870,307 A | | 9/1989 | Kitamura et al. |
| 5,629,575 A | | 5/1997 | Cazal et al. |
| 5,861,691 A | * | 1/1999 | Soh et al. ...................... 310/89 |
| 5,998,903 A | | 12/1999 | Umeda et al. |
| 6,326,715 B1 | | 12/2001 | Asao et al. |
| 6,462,446 B2 | * | 10/2002 | Cook et al. .................... 310/91 |
| 6,617,716 B2 | * | 9/2003 | Ishida ......................... 310/58 |

FOREIGN PATENT DOCUMENTS

| | | |
|---|---|---|
| EP | 0 240 644 | 10/1987 |
| EP | 0 881 751 | 12/1998 |
| FR | 2 793 083 | 11/2000 |
| JP | 4-364339 | 12/1992 |
| JP | 5-083901 | 4/1993 |
| JP | 5-137290 | 6/1993 |
| JP | 5-50217 | 7/1993 |
| JP | 6-225485 | 8/1994 |
| JP | 40-6225485 | 8/1994 |
| JP | 41-0271719 | 10/1998 |

* cited by examiner

*Primary Examiner*—Thanh Lam
(74) *Attorney, Agent, or Firm*—Oliff & Berridge, PLC

(57) ABSTRACT

In a rotary electric machine with a stator elastic support structure, conductor segments of a stator winding, each of which is formed into an approximate U-shape, are inserted into slots of a stator core in such a manner that leg parts of each conductor segment penetrate through the slots from one end of the stator core to the other end thereof and are connected at top ends. Further, the conductor segments are arranged to have a predetermined clearance between adjacent two thereof at both coil ends of the stator winding, and a cooling fan is disposed so that air is blown toward the clearances of the conductor segments. Accordingly, when the stator core is supported in a frame through an elastic member, a magnetic noise can be reduced while it can effectively prevent heat deterioration of the elastic member due to heat radiated from the stator core and the stator winding, in low cost.

20 Claims, 6 Drawing Sheets

ROTARY ELECTRIC MACHINE WITH STATOR ELASTIC SUPPORT STRUCTURE

CROSS REFERENCE TO RELATED APPLICATION

Divisional application of prior application Ser. No. 09/740,038, filed Dec. 20, 2000, now abandoned.

The present application is based on and claims priority from Japanese Patent Application No. Hei. 11-360967 filed on Dec. 20, 1999, the contents of which are incorporated herein by reference.

BACKGROUND OF THE INVENTION

1. Field of the Invention

The present invention relates to a rotary electric machine with a stator elastic support structure, which effectively reduces noise while preventing a heat deterioration of an elastic member in low cost. The present invention is suitably applied to a vehicle AC generator.

2. Description of the Related Art

In a rotary electric machine described in JP-B2-5-50217, an elastic member is inserted between a stator core and a frame for reducing a magnetic noise. The elastic member has a structure where a rubber material is inserted between an outer metal cylinder and an inner metal cylinder.

In a rotary electric machine described in U.S. Pat. No. 5,629,575, a shock absorbing member is inserted between a stator core and a frame so that an arrangement position of the stator core can be readily set.

Further, a rotary electric machine described in JP-B2-2927288, each of U-shaped conductor segments is inserted into a pair of slots, and top parts of each conductor segment is connected to form a stator winding.

In recent years, it is requested to reduce a magnetic noise generated in a rotary electric machine. If the rotary electric machine is entirely covered by a noise insulation case, the magnetic noise can be reduced. However, in this case, it is difficult to radiate heat generated by a stator winding and a stator core, through a frame. Accordingly, temperature of the stator winding is increased, and an elastic member or an insulation film is readily heat-deteriorated. To overcome this problem, when the elastic member is formed of a heat-resistance rubber such as a silicon rubber and a fluoro rubber, elastic performance of the elastic member is decreased. Therefore, the elastic member does not effectively absorb a vibration transmission and the magnetic noise. Further, due to high cost of the heat-resistance rubber, it is difficult to use the heat-resistance rubber as the elastic member actually. On the other hand, when a thickness of the elastic member is increased for absorbing the vibration transmission from the stator core to the frame, it is difficult to transmit heat generated by the stator winding to the frame, and heat deterioration of the elastic member or the insulator film is facilitated.

Further, when the dimension of the stator winding or the stator core is increased for reducing heat generated from the stator winding or the stator core, the size and the wight of the rotary electric machine are increased, and the machine is impossible to be actually used.

SUMMARY OF THE INVENTION

In view of the foregoing problems, it is an object of the present invention to provide a rotary electric machine with a stator elastic support structure, which reduces noise while preventing heat deterioration of an elastic member or an insulator film, in low cost.

According to the present invention, in a rotary electric machine, a stator core having a plurality of slots is disposed to be supported in a frame, a stator winding includes a plurality of conductor segments each of which is formed into an approximate U-shape having a pair of leg parts, and an elastic member is disposed between the stator core and the frame to be inserted therebetween. The conductor segments are inserted into the slots of the stator core in such a manner that, the leg parts of each conductor segment penetrate through the slots from one end of the stator core to the other end thereof, and are connected at top ends. Further, the conductor segments are arranged to have a predetermined clearance between adjacent two thereof at both coil ends of the stator winding, into which air blown by a cooling fan flows. Accordingly, the clearances between the conductor segments define an air passage through which air blown by the cooling fan flows, and the stator winding can be effectively cooled. Because each the conductor segment has a large sectional area in a radial direction, heat generated by the stator core can be readily transmitted to the both coil ends of the stator winding. Therefore, the temperature of the stator winding can be effectively reduced without increasing dimensions of the stator core and the stator winding. Thus, when the elastic member is inserted between the frame and the stator core for reducing a magnetic noise, or when the conductor segments are covered by an insulation film, it can effectively prevent a heat deterioration of the elastic member or the insulation film, due to heat radiated from the stator winding and the stator core, in low cost.

Preferably, the elastic member has a cylindrical elastic portion made of rubber, a first cylindrical metal portion integrated with an inner surface of the cylindrical elastic portion, and a second cylindrical metal portion integrated with an outer surface of the cylindrical elastic portion. Therefore, it is possible to strongly bonding the elastic member and the frame or the stator core, by using the elastic performance of the elastic portion and the strength of the first and second cylindrical metal portions.

Further, the frame includes first and second frame parts separated in an axial direction of the rotor, the first and second frame parts are disposed to be fastened in the axial direction while press-contacting outer peripheral edge parts of the stator core through the elastic member. Therefore, the elastic member can be readily inserted between the stator core and the first and second frame parts. In this case, the first and second frame parts are fastened through a fastening member such as a through bolt, and a reduction effect of the magnetic noise due to the elastic member and a reduction effect of vibration of the stator core can be arbitrarily adjusted.

Preferably, the elastic member includes first and second ring-like elastic parts each of which has an approximate L-shaped cross-section in the axial direction. Therefore, the stator core can be accurately supported in the first and second frame parts through the ring-like elastic parts.

More preferably, a middle part of an outer peripheral surface of the stator core in the axial direction is disposed to expose to an outside. Therefore, the exposed part of the outer peripheral surface of the stator core can be effectively cooled by an air flow, for example.

On the other hand, an inner peripheral surface of the frame has plural frame slots extending in the axial direction of the rotor at positions opposite to the stator core, and the elastic member includes plural elastic parts which are inserted into the frame slots to have elastic surfaces corresponding to the inner peripheral surface of the frame. Therefore, when an electrical power is generated, the elastic member is heat-expanded to protrude to a radial inner side and to elastically support the outer peripheral surface of the stator core.

Preferably, the frame is disposed to define a liquid fluid passage through which a cooling fluid for cooling the stator core flows, and the elastic member is disposed between the frame and the stator core to directly contact the cooling fluid. Therefore, the magnetic noise can be reduced while the heat deterioration of the elastic member can be further effectively prevented.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

Preferred embodiments of the present invention will be described with reference to the appended drawings hereafter.

Figure 1:
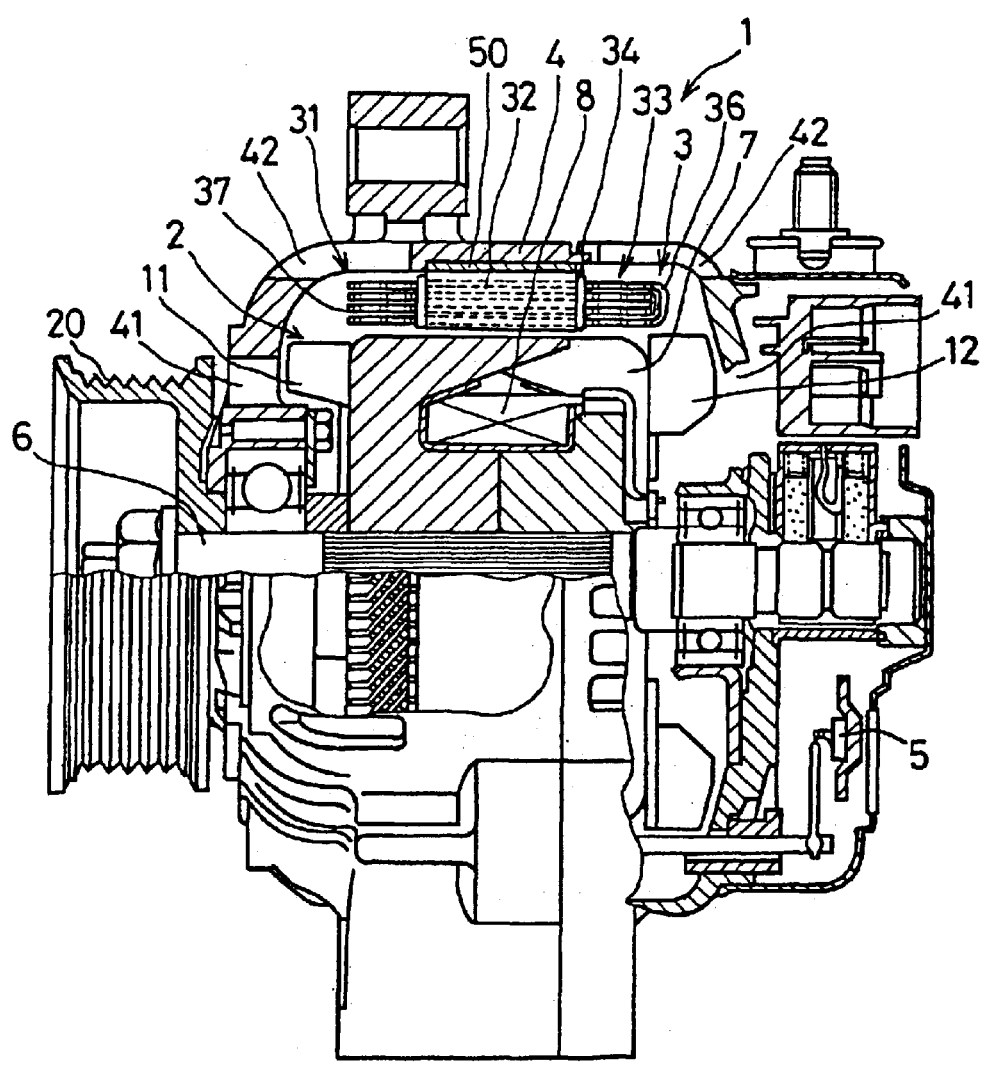
FIG. 1 is a schematic sectional view showing an entire structure of a rotary electric machine for a vehicle AC generator according to a first preferred embodiment of the present invention.

A first preferred embodiment of the present invention will be now described with reference to FIGS. 1–4. In the first embodiment, the present invention is typically applied to an AC generator. As shown in FIG. 1, an AC generator 1 includes a rotor 2, a stator 3, a frame 4, a rectifier 5 and others.

The rotor 2 includes a field coil 8 which is formed of a cylindrically wound insulated copper wire and is fixed to a shaft by a pair of front and rear pole cores 7 each having six claw poles between opposite ends thereof. A cooling fan 11 is fixed by welding or the like to the front pole core 7 so that cooling air sucked from a front end of the generator 1 is blown in a radial direction. Further, a cooling fan 12 is fixed by welding or the like to the rear pole core 7 so that cooling air sucked from a rear end of the generator 1 is blown in the radial direction. An outer peripheral surface of the pole core 7 is disposed to face an inner peripheral surface of a stator core 32 by a predetermined clearance.

Figure 3:
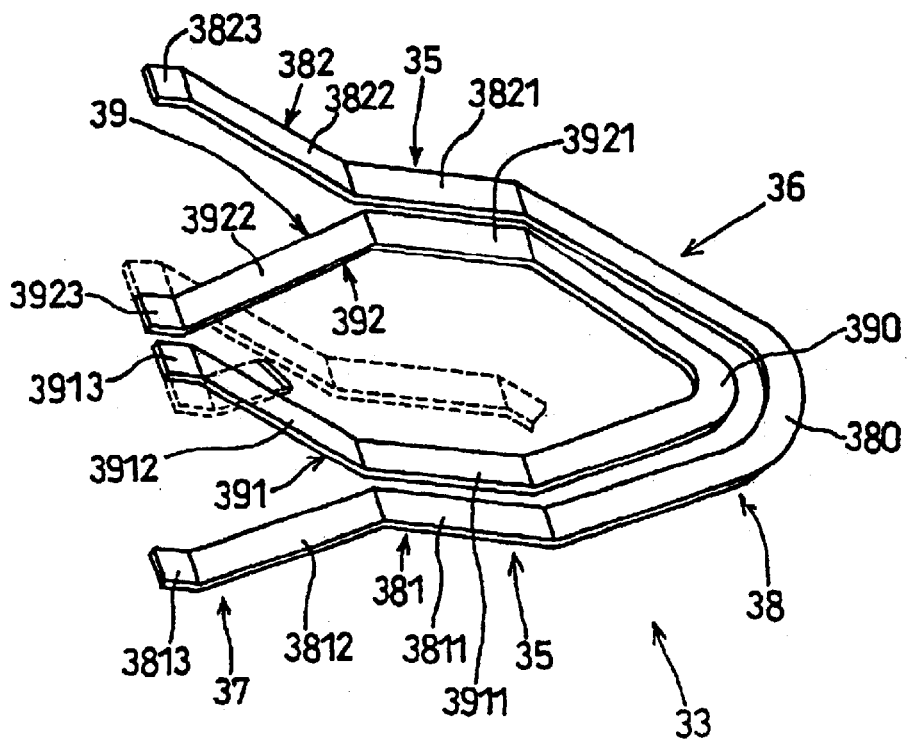
FIG. 3 is a perspective view showing a conductor segment for constructing a stator winding, according to the first embodiment.

The stator 3 includes a stator winding 31 and the stator core 32. The stator winding 31 is electrically insulated from the stator core 32 by resinous insulators 34 inserted into slots of the stator core 32. The stator winding 31 is formed of three-phase windings each of which is constructed by connecting plural conductor segments 33 in series in order. Each of the conductor segments 33 is constructed by two conductor segment parts 38, 39 each of which is formed into an approximate U shape, as shown in FIG. 3. As shown in FIG. 1, a part of the coil winding 31 protrudes from both end surfaces of the stator core 32 to form coil ends 36, 37.

Frame 4 accommodates and supports the stator 3 and the rotor 2 so that the stator core 32 is supported by a wall part of the frame 4. The frame 4 has air-discharge windows 42 (i.e., air openings) formed opposite to the coil ends 36, 37 of the stator winding 31, and air-intake windows 41 (i.e., air openings) formed at the axial ends thereof.

An outer peripheral surface of the stator is supported in an inner peripheral surface of the frame 4 through an elastic member 50. In the first embodiment, the elastic member 50 is bonded on the outer peripheral surface of the stator core 32. After the frame 4 is sufficiently thermal-expanded, the stator 3 to which the elastic member 50 is attached is inserted into the frame 4.

When engine torque is transmitted to a pulley 20 via a belt and the like, the rotor 2 rotates in a prescribed direction. In this case, the field coil 8 of the rotor 2 is powered from outside, the claw poles of the pair of pole cores 7 are magnetized so that three-phase AC voltage can be generated in the stator winding 31. As a result, a predetermined amount of DC current fan be output from an output terminal of the rectifier 5.

Figure 2:
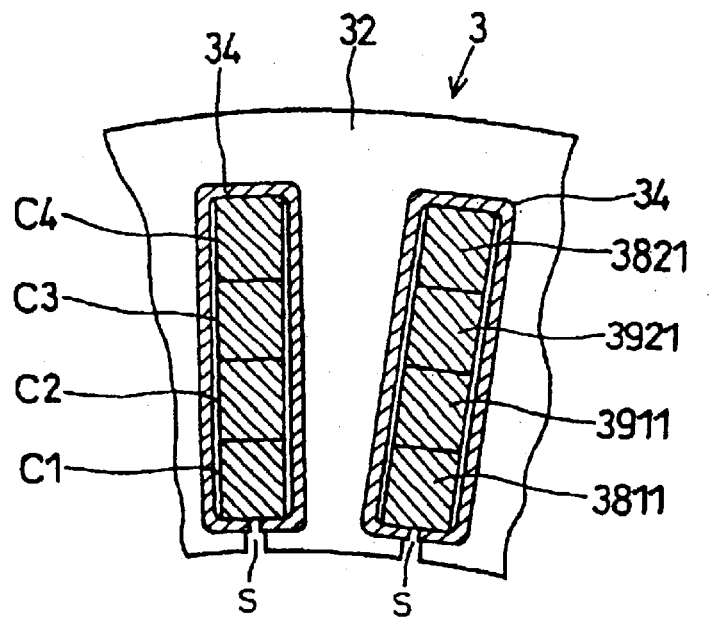
FIG. 2 is a sectional view of a stator in a radial direction, showing a part of the stator, according to the first embodiment.

FIG. 2 is a fragmentary sectional view of the stator 3 in the radial direction, showing two slot parts of the stator 3. FIG. 3 is a schematic perspective view showing a conductor segment 33. As shown in FIG. 2, the stator core 32 has plural slots S for accommodating the plural-phase windings of the stator winding 31. Each of the insulators 34 is disposed for electrically insulating the stator core 32 and the stator winding 31. In the first embodiment, the slots S are provided at 36 positions at the same intervals, corresponding to pole numbers of the rotor 2. Within each slot S, even-numbered receiving parts C1, C2, C3, C4 (e.g., four receiving parts) are provided in order from a radial inner side to a radius outside. That is, the receiving parts C1, C2, C3, C4 are slot insertion positions C1, C2, C3, C4 of the stator core 32, in which conductor segment parts 38, 39 of each conductor segment 33 are inserted. The stator winding 31 constructed by connecting the conductor segments 33 can be divided into a slot conductor portion 35 inserted into the slots S of the stator core 32, the coil end 36 (first coil end) protruding from the slot conductor portion 35 to the rear side (a slot outside), and the coil end 37 (second coil end) protruding from the slot conductor portion 35 to the front side (a slot outside).

In each conductor segment 33, the conductor segment part 38 composed of plural flat wires is formed into an approximate U shape with a large radial dimension, and the conductor segment part 39 composed of plural flat wires is formed into an approximate U shape with a small radial dimension. In addition, I-shaped conductor segment part constructed by I-shaped wires is also used as a draining wire or a connection wire.

As shown in FIG. 3, the conductor segment part 38 includes a head portion 380 for constructing the first coil end 36 and a pair of leg portions 381, 382 extending from both ends of the head portion 380. The head portion 380 includes connection portions each having a predetermined span in a peripheral direction, at which the leg portions 381, 382 are connected.

The leg portion 381 includes a slot conductor portion 3811 accommodated in the slot insertion position C1 of the slot S, and a top protrusion portion 3812 protruding to a front side from the slot conductor portion 3811. A connector 3813 is provided at a tot end of the top protrusion portion 3812.

The leg portion 382 includes a slot conductor portion 3821 accommodated in the slot insertion position C4 of the slot S, and a top protrusion portion 3822 protruding to a front side from the slot conductor portion 3821. A connector 3823 is provided at a top end of the top protrusion portion 3822. The top protrusion portions 3812, 3822 of the leg portions 381, 382 are for constricting the second coil end 37 in the first embodiment.

Base ends (i.e., the ends connected to the slot conductor portions 3821, 3811) of the top protrusion portions 3812, 3822 are separated from top ends thereof, respectively, by an approximate half dimension of the head portion 380 in the peripheral direction.

The conductor segment part 39 includes an approximate U-shaped head portion 390 and a pair of leg portions 391, 392 extending from both ends of the head portion 390. The head portion 390 includes connection portions each having a predetermined span in a peripheral direction, at which the leg portions 391, 392 are connected.

The leg portion 391 includes a slot conductor portion 3911 accommodated in the slot insertion position C2 of the slot S, and a top protrusion portion 3912 protruding to the front side from the slot conductor portion 3911. A connector 3913 is provided at a top end of the top protrusion portion 3912.

The leg portion 392 includes a slot conductor portion 3921 accommodated in the slot insertion position C3 of the slot S, and a top protrusion portion 3922 protruding to a front side from the slot conductor portion 3921. A connector 3923 is provided at a top end of the top protrusion portion 3922. The top protrusion portions 3912, 3922 of the leg portions 391, 392 are for constructing the second coil end 37 in the first embodiment.

Base ends (i.e., the ends connected to the slot conductor portions 3921, 3911) of the top protrusion portions 3912, 3922 are separated from top ends thereof, respectively, by an approximate half dimension of the head portion 390 in the peripheral direction.

The slot conductor portions 3811, 3821 of the pair of the leg portions 381, 382 of the conductor segment part 38 having a large radius dimension are respectively accommodated in different slots positions separated with a predetermined pole pitch. Similarly, the slot conductor portions 3911, 3921 of the pair of the leg portions 391, 392 of the conductor segment part 39 having the small radius dimension are respectively accommodated in different slot positions separated with a predetermined pole pitch.

The slot conductor portion 3811 of the leg portion 381 of the conductor segment part 38 is accommodated in the shallowest slot insertion position C1, and the slot conductor portion 3821 of the leg portion 382 of the conductor segment part 38 is accommodated in the deepest slot insertion position C4.

Similarly, the slot conductor portion 3911 of the leg portion 391 of the conductor segment part 39 is accommodated in the shallower slot insertion position C2 which is slightly deeper than the slot insertion position C1, and the slot conductor portion 3921 of the leg portion 392 of the conductor segment part 39 is accommodated in the deeper slot insertion position C3 which is slightly shallower than the slot insertion position C4.

Accordingly, in the first coil end 36 on the rear side, the head portion 380 of the conductor segment part 38 can be disposed to cover the head portion 390 of the conductor segment part 39, and it can prevent both head portions 380, 390 from interfering with each other.

Specifically, in the first coil end 36, the head portion 380 is connected to the slot conductor portion 3811 of the leg portion 381 inserted into the slot insertion position C1, and the slot conductor portion 3821 of the leg portion 382 inserted into the slot insertion position C4. Further, the head portion 390 is connected to the slot conductor portion 3911 of the leg portion 391 inserted into the slot insertion position C2, and the slot conductor portion 3921 of the leg portion 392 inserted into the slot insertion position C3.

Further, in the second coil end 37, the top protrusion portion 3812 of the leg portion 381 of the conductor segment part 38, inserted into the slot insertion position C1, is connected to the adjacent top protrusion portion 3912 of the leg portion 391 of the conductor segment part 39, inserted into the slot insertion position C2, at top end sides of the top protrusion portions 3812, 3912. Similarly, the top protrusion portion 3822 of the leg portion 382 of the conductor segment part 38, inserted into the slot insertion position C4, is connected to adjacent the top protrusion portion 3922 of the leg portion 392 of the conductor segment part 39, inserted into the slot insertion position C3, at top end sides of the top protrusion portions 3822, 3922.

Figure 4:
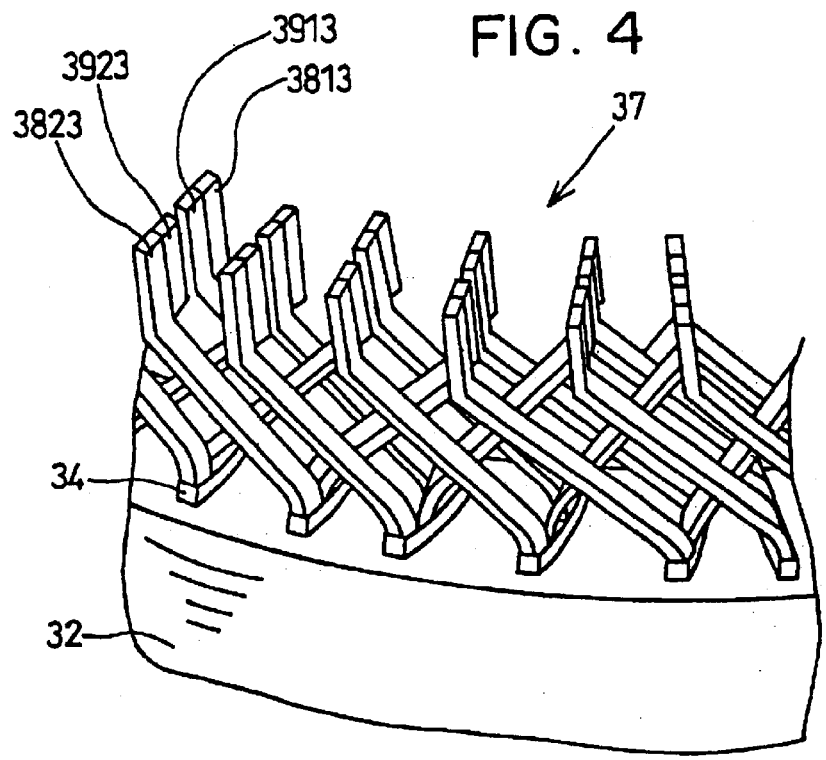
FIG. 4 is a perspective view showing a coil end of the stator winding according to the first embodiment.

That is, in the second coil end 37, the slot conductor portion 3811 of the leg portion 381, inserted into the slot insertion position C1, is connected to the slot conductor portion 3911 of the leg portion 391, inserted to the slot insertion position C2. Further, the slot conductor portion 3821 of the leg portion 382, inserted into the slot insertion position C4, is connected to the slot conductor portion 3921 of the leg portion 392, inserted to the slot insertion position C3. Accordingly, each of the three-phase windings of the stator winding 31 is formed. FIG. 4 shows a part of the second coil end 37 on the front side.

In the first embodiment, a slot conductor portion constructing a drain wire of the stator winding 31 and the other slot conductor portion have shapes different from those of the U-shaped conductor segment parts 38, 39. That is, in the first coil end 36 on the rear side, an approximate U-shaped conductor segment having special shape is provided for connecting the slot conductor portions at the slot insertion positions C1, C4 and the slot conductor portions C2, C3.

The stator winding 31 with the three-phase windings can be formed into various shapes by connecting plural conductor segment parts in order.

Next, a cooling method of the stator winding 31 will be now described. The stator winding 31 is cooled by cooling the first and second coil ends 36, 37. As shown in FIGS. 3, 4, at the first and second coil ends 36, 37, the conductor segments 33 are arranged to have predetermined clearances therebetween. That is, cool air passages are defined between the conductor segments 33 at the first and second coil ends 36, 37. Therefore, air blown from the cooling fans 11, 12 passes through the clearances, and discharges radially outside to cool the first and second coil ends 36, 37.

That is, in the first and second coil ends 36, 37 of the stator winding 31 having the above-described structure, air can uniformly conduct the surfaces of the conductor segments 33 to absorb heat from the conductor segments 33.

The conductor segments 33, each of which is formed of a flat wire, has a sectional area greatly larger than that of round-shaped conductive wires. Therefore, the stator winding 31 can be readily assembled without a deformation. Accordingly, it can prevent the coil ends 36, 37 from being partially super-heated due to a closed air passage or a narrowed air passage.

Further, because the conductor segments 33 have the large sectional area, heat generated by the slot conductor portion (i.e., the slot receiving portion) of the conductor segments 33 can be readily transmitted to the coil ends 36, 37 in an extending direction of the conductor segments 33. Therefore, electrical resistance of the stator winding 31 can be reduced, and heat-generating amount thereof can be reduced. Accordingly, it can prevent a super-heating from being generated in the slot conductor portion of the conductor segments 33. As a result, the temperature of the stator winding 31 can be suppressed to be lower than that of the stator core 32.

According to the first embodiment of the present invention, as shown in FIG. 1, the stator core 32 is supported in the frame 4 through the elastic member 50. That is, the elastic member 50 is inserted between the stator core 32 and the frame 4. The elastic member 50 formed into a cylindrical shape can be made of a rubber material. The elastic member 50 is disposed to reduce a magnetic noise transmitted to the frame 4 from the stator core 32.

In the first embodiment, heat generated by the stator winding 31 or the stator core 32 is radiated to air which directly contacts the stator winding 31 at the coil ends 36, 37. Further, the stator winding 31 are constructed by the conductor segments 33 which are formed of flat wires and are arranged to have approximate equal clearances (i.e., air passages) therebetween at the coil ends 36, 37 in the peripheral direction.

Accordingly, a temperature increase in the stator core 32 and the stator winding 31 can be sufficiently restricted as compared with a rotary electric machine having a conventional winding-type stator coil. As a result, heat-deterioration of the elastic member 50 can be reduced to a usable range, and it is possible to insert the elastic member 50 made of rubber as a main material into the stator core 32 and the frame 4 of the rotary electric machine. In this case, when the thickness of the elastic member is made larger, the elastic member 50 can effectively absorb a vibration transmission. In the first embodiment, for the elastic member 50, it is unnecessary to use an expensive heat-resistance rubber such as a silicone rubber or a fluoro rubber. That is, for forming the elastic member 50, a nitrile rubber or an acrylate rubber can be used. Further, in a vehicle with a loose temperature condition, a natural rubber also can be used, so that the magnetic noise can be decreased in low cost.

In the above-described first embodiment, the elastic member 50 is formed into the cylindrical shape to cover an entire outer peripheral surface of the stator core 32. However, the elastic member 50 can be formed into the other shape such as a round shape or a shape having plural protrusions. In this case, a part of the outer peripheral surface of the stator core 32 is opposite to the inner peripheral surface of the frame 4 through a gap without contacting the elastic member 50. In this case, a window (air opening) for introducing air can be provided in the frame 4 facing the gap.

Figure 5:
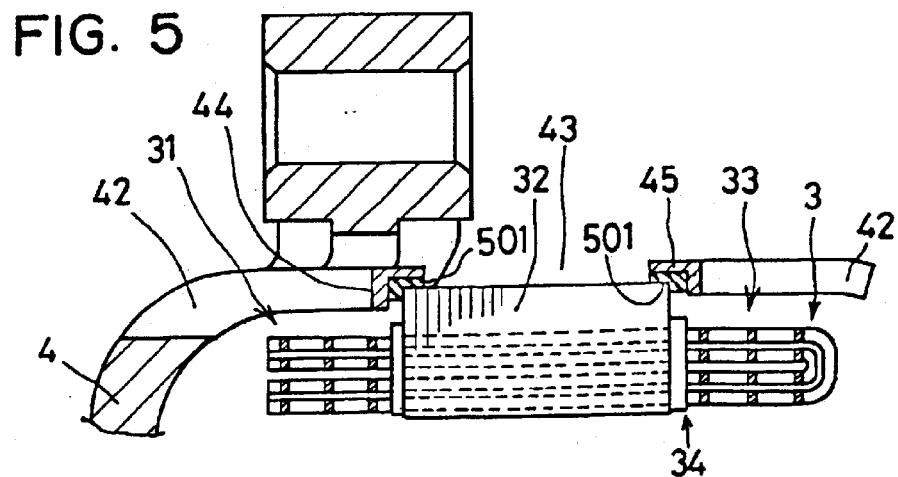
FIG. 5 is a sectional view showing a part of a rotary electric machine for a vehicle AC generator, according to a second preferred embodiment of the present invention.
Figure 6:
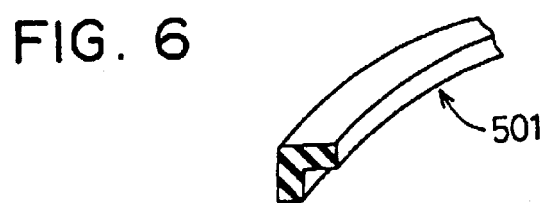
FIG. 6 is a partial perspective view showing an elastic member according to the second embodiment.

A second preferred embodiment of the present invention will be now described with reference to FIGS. 5 and 6. In the above-described first embodiment, the elastic member 50 made of rubber is used. In the second embodiment, as shown in FIGS. 5 and 6, instead of the elastic member 50, a pair of elastic members 501 are disposed to be inserted between stator core 32 and the frame 4. Further, an opening 43 is provided at a position facing the outer peripheral surface of the stator core 32. The frame 4 has both wall parts 44, 45 extending in a peripheral direction between the air openings 42 and the opening 43, for defining the air openings 42 and the opening 43. Each of the wall parts 44, 45 has a L-shaped cross section.

Each of the elastic members 501 is formed of a rubber ring having a L-shaped cross section in an axial direction. Both side wall parts are crossed by a predetermined angle to form the L shape. In the second embodiment, the predetermined angle can be set at an approximate right angle. Generally, the predetermined angle of the L-shaped elastic member 501 is set in a range of 70–105°. The elastic members 501 are disposed between both outer peripheral edge parts of the stator core 32 and the wall parts 44, 45 of the frame 4.

The front elastic member 501 (i.e., left elastic member in FIG. 5) has both wall parts extending a radial inner side and the rear side, and press-contacts both surfaces of a step portion of the wall part 44, opened to the rear side. Further, the rear elastic member 501 (i.e., right elastic member in FIG. 5) has both wall parts extending a radial inner side and the front side, and press-contacts both surfaces of a step portion of the wall part 45, opened to the front side. The elastic members 501 having the same shapes can be disposed reversely in the axial direction, as shown in FIG. 5.

According to the second embodiment of the present invention, the elastic members 501 can reduce both of vibration in the radial direction and vibration in the axial direction, transmitted from the stator core 32 to the frame 4. In addition, the outer peripheral surface of the stator core 32 can be effectively cooled through the opening 43. When the frame 4 is divided into a from frame and a rear frame, the wall part 44 is provided at a rear end of the front frame, and the wall part 45 is provided at a front end of the rear frame. In this case, by fastening the front frame and the rear frame using a fastening member such as a through bolt, the stator core 32 can be held between the front frame and the rear frame.

In the second embodiment, the other part are similar to those of the above-described first embodiment.

Figure 7:
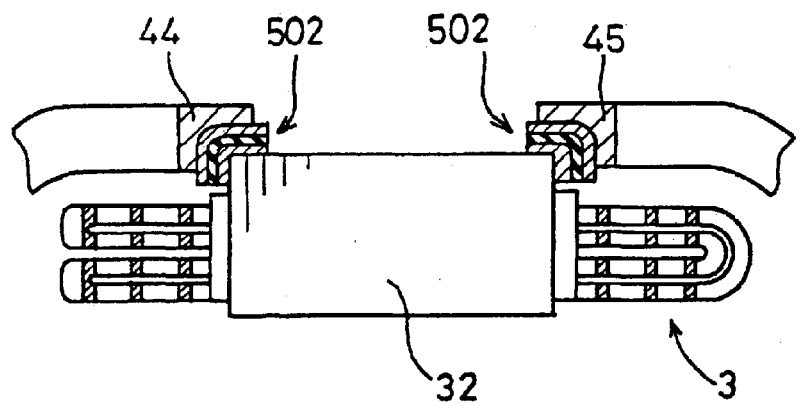
FIG. 7 is a sectional view showing a part of a rotary electric machine for a vehicle AC generator, according to a third preferred embodiment of the present invention.
Figure 8:
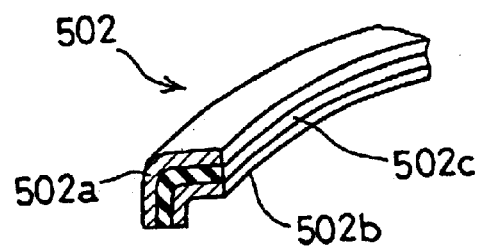
FIG. 8 is a partial perspective view showing an elastic member according to the third embodiment.

A third preferred embodiment of the present invention will be now described with reference to FIGS. 7 and 8. In the third embodiment, elastic members 502 shown in FIGS. 7 and 8 are used. Each of the elastic members 502 has an elastic portion 502c having a ring shape similar to that of the elastic member 501 described in the second embodiment, and metal rings 502a, 502b disposed at both sides of the elastic portion 502c. Each of the metal rings 502a, 502b has L-shaped cross section corresponding to the L-shape cross-section of the elastic portion 502c of the elastic member 502. Because the elastic portion 502c is inserted between the metal rings 502a, 502b to be held therebetween in the elastic member 502, the elastic members 502 can be accurately disposed at a predetermined position without a deformation, and it can prevent the stator core 32 from being shifted from the rotor 2. Accordingly, an air gap between the inner peripheral surface of the stator core 32 and the outer peripheral surface of the rotor 2 can be made uniform, and the magnetic noise can be further effectively reduced.

In the third embodiment, the other parts are similar to those of the above-described second embodiment.

A fourth preferred embodiment of the present invention will be now described with reference to FIG. 9. In the fourth embodiment, the elastic members 502 described in the third embodiment are used. However, in the fourth embodiment, the shape of the frame 4 is changed so that a flat tube 101 defining a water passage 100 through which cooling water flows is provided between the frame 4 and the stator core 32.

Figure 9:
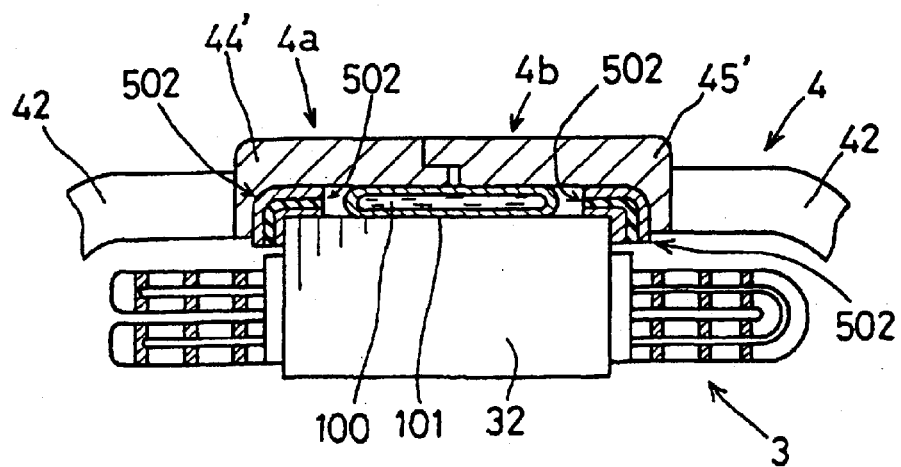
FIG. 9 is a sectional view showing a part of a rotary electric machine for a vehicle AC generator, according to a fourth preferred embodiment of the present invention.

As shown in FIG. 9, the frame 4 includes a front frame 4a having a step-like rear opening end, and a rear frame 4b having a step-like front opening end. When the step-like rear opening end of the front frame 4a and the step-like front opening end of the rear frame 4b are engaged, a wall part 44' of the front frame 4a contacts the metal ring 502a of the front elastic member 502, and a wall part 45' of the rear frame 4b contacts the metal ring 502a of the rear elastic member 502.

The flat tube 101 is formed of a thin aluminum pipe, and is disposed to contact both the stator core 32 and the wall parts 44', 45' of the frame 4. Because cooling water flows through the water passage 100 of the flat tube 101, the stator core 32 can be readily cooled. In the fourth embodiment, the temperature of the stator core 32 can be further reduced, and the heat deterioration of the elastic portion 502c of the elastic member 502 can be further prevented. In the fourth embodiment, the other parts are similar to those of the above-described first embodiment.

Figure 10:
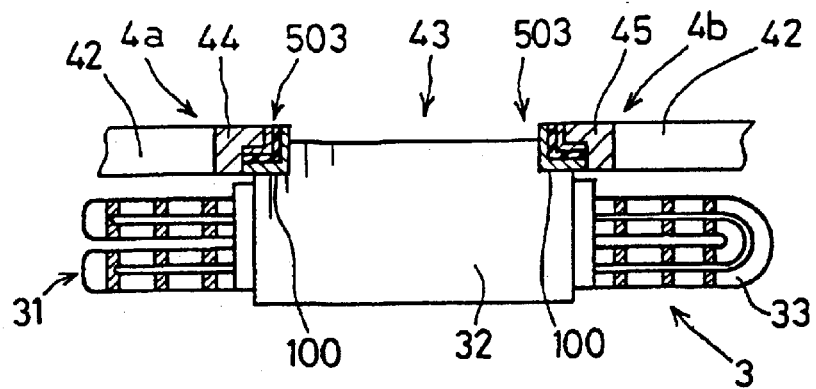
FIG. 10 is a sectional view showing a part of a rotary electric machine for a vehicle AC generator, according to a fifth preferred embodiment of the present invention.
Figure 11:
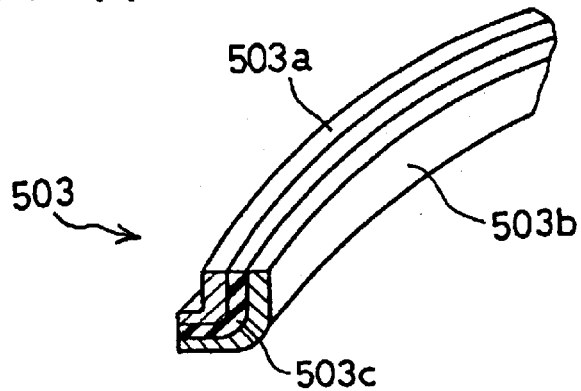
FIG. 11 is a partial perspective view showing an elastic member according to the fifth embodiment.

A fifth preferred embodiment of the present invention will be now described with reference to FIGS. 10 and 11. In the fifth embodiment, elastic members 503 having the shape indicated in FIGS. 10 and 11 are used. Further, the shape of the stator core 32 is changed to correspond to the structure of the elastic members 503.

Each of the elastic members 503 includes an elastic portion 503c having a L-shaped cross-section, and metal rings 503a, 503b disposed at both sides of the elastic portion 503c. Each of the metal rings 503a, 503b has L-shaped cross-section corresponding to the L-shape of the elastic portion 503c of the elastic member 503. The wall part 44 of the front frame 4a is formed to contact both surfaces of step portion of the metal ring 503a at a position immediately rear from the front opening 42. Similarly, the wall part 45 of the rear frame 4b is formed to contact both surfaces of the step portion of the metal ring 503a at a position immediately front from the rear opening 42.

The front elastic member 503 (i.e., left elastic member in FIG. 5) has both wall parts extending to a radial outer side and the front side, and press-contacts both surfaces of a step portion of the stator core 32, provided at a front outer-peripheral edge of the stator core 32. Further, both the wall parts of the front elastic member 503 press-contact both surfaces of a step portion of the wall part 44, opened to the rear side. Similarly, the rear elastic member 503 (i.e., right elastic member in FIG. 10) has both wall parts extending to a radial outer side and the rear side, and press-contacts both surfaces of a step portion of the stator core 32, provided at a rear outer-peripheral edge of the stator core 32. Further, both the wall parts of the rear elastic member 503 press-contact both surfaces of a step portion of the wall part 45, opened to the front side. Both the elastic members 503 can be formed into the same shape. In this case, both the elastic members 503 are disposed reversely in the axial direction.

According to the fifth embodiment, an arrangement position of the stator core 32 can be accurately determined, while cooling performance of the stator core 32 is improved. In the fifth embodiment, the other part are similar to those of the above-described first embodiment.

Figure 12:
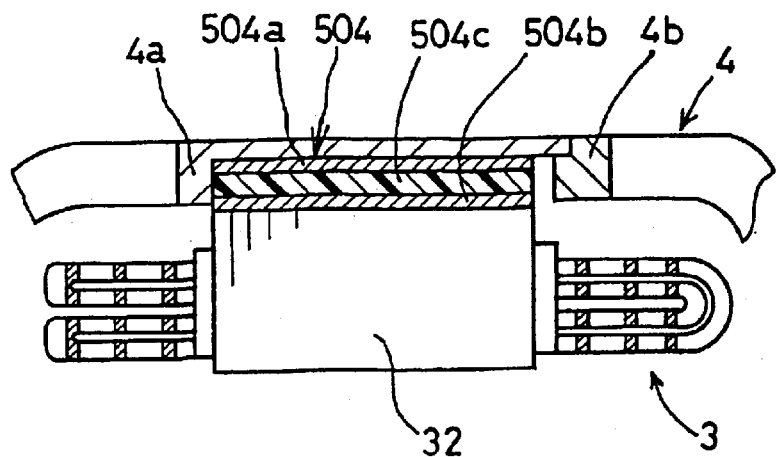
FIG. 12 is a sectional view showing a part of a rotary electric machine for a vehicle AC generator, according to a sixth preferred embodiment of the present invention.

A sixth preferred embodiment of the present invention will be now described with reference to FIG. 12. In the sixth embodiment, an elastic member 504 having a cylindrical shape is used. The frame 4 is divided into a front frame 4a and a rear frame 4b. The elastic member 504 includes an elastic portion 504c made of rubber, and metal cylindrical portions 504a, 504b at both sides of the cylindrical elastic portion 504c. In the elastic member 504, the elastic portion 504c is inserted between the metal cylindrical portions 504a, 504b to be integrally boded to the metal cylindrical portions 504a, 504b. In the sixth embodiment, the stator core 32 can be accurately held at a predetermined position through the elastic member 504.

In the sixth embodiment, when the elastic portion 504c is made a rubber material where a powder of a heat-conductive material such as aluminum or a short fiber is mixed, a resistance of heat-transmission in the radial direction of the elastic portion 504c can be reduced. That is, heat can be readily transmitted in the radial direction of the elastic portion 504c. Accordingly, heat deterioration of the elastic member 504 can be restricted, while the magnetic noise can be reduced. In the sixth embodiment, the other parts are similar to those of the above-described first embodiment.

Figure 13:
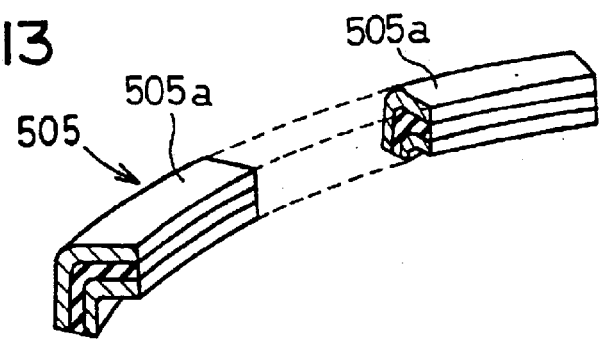
FIG. 13 is a partial perspective view showing an elastic member used for a rotary electric machine according to a seventh preferred embodiment of the present invention.

A seventh preferred embodiment of the present invention will be now described with reference to FIG. 13. In the seventh embodiment, an elastic member 505 is divided into plural circular-arc elastic pieces 505a which are arranged in a circumferential direction at predetermined positions so that a predetermined space is provided between adjacent elastic pieces 505a in the circumferential direction. In this case, the spaces between the elastic pieces 505a can be used as a cool air passage, and the stator core 32 can be effectually cooled using the cool air passage. Each of the elastic pieces 505a of the elastic member 505 has a second structure similar to that of the elastic member 502 described in the third embodiment (FIGS. 7, 8).

An eighth preferred embodiment of the present invention will be now described with reference to FIG. 14. In the eighth embodiment, plural slots 401 are provided in the inner peripheral surface of the frame 4, for covering the outer peripheral surface of the stator core 32, and plural elastic members 506 are inserted into the slots 401.

Figure 14:
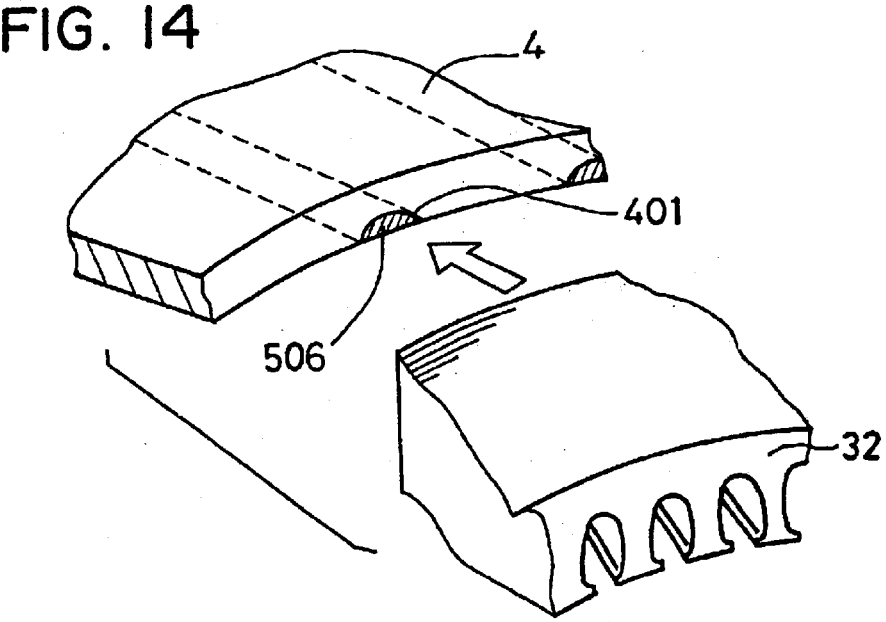
FIG. 14 is a partially-sectional perspective view showing a part of a rotary electric machine for a vehicle AC generator, according to an eighth preferred embodiment of the present invention.

As shown in FIG. 14, each of the slots 401 has an approximate semi-circular shape in cross section, and exposed surfaces of the elastic members 506 inserted into the slots 401 define a part of the inner peripheral surface of the frame 4. Here, the elastic members 506 can slightly protrude from the inner peripheral surface of the frame 4.

When electrical power is generated, the elastic members 506 are heat-expanded to protrude to the side of the stator core 32. Therefore, the outer peripheral surface of the stator core 32 can be elastically supported by the elastic members 506 arranged in the peripheral direction with a predetermined pitch.

Figure 15:
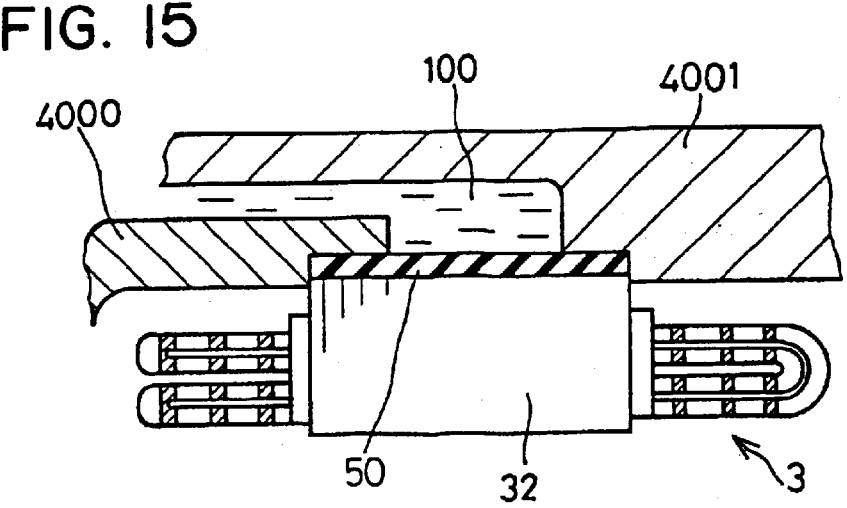
FIG. 15 is a sectional view showing a part of a rotary electric machine for a vehicle AC generator, according to a ninth preferred embodiment of the present invention.

A ninth preferred embodiment of the present invention will be now described with reference to FIG. 15. In the ninth embodiment, a frame structure described in the first embodiment is changed. That is, as shown in FIG. 15, a frame is constructed by first and second sealed frames 4000, 4001 which defines a water passage 100 through which water flows toward a radial outer side of the elastic member 50. In this case, because cooling water in the cooling water passage 100 directly contacts the elastic member 50, heat-deterioration of the elastic member 50 can be effectively restricted. Further, the elastic member 50 is used as a seal material of the water passage 100. Accordingly, cooling performance of the stator core 32 can be improved due to cooling water in the cooling water passage 100. Thus, heat-deterioration of the elastic member 50 can be restricted, and magnetic vibration can be reduced.

In the ninth embodiment, when a stator winding are constructed by conductive segments having a larger sectional area in the radial direction, the heat-deterioration of the elastic member 50 can be further restricted.

In the ninth embodiment, because the sealed frames 4000, 4001 and the elastic member 50 define a sealed space, a cooling fan is not necessary. In this case, a frame strength can be improved, and the magnetic noise can be further reduced.

Although the present invention has been fully described in connection with the preferred embodiments thereof with reference to the accompanying drawings, it is to be noted that various changes and modifications will become apparent to those skilled in the art.

For example, in the above-described third, fourth, fifth and seventh embodiments, the metal ring 502b, 503b, 505b of the elastic member 502, 503, 505 contacting the outer peripheral surface of the stator core 32 can engage with the stator core 32. In this case, the stator core 32 can be accurately assembled to an integrated frame 4, and assembling operation of a rotary electric machine can be made simple.

In the above-described embodiments, the present invention is typically applied to the vehicle AC generator. However, the present invention can be applied to a rotary electric machine other than the vehicle AC generator.

Such changes and modifications are to be understood as being within the scope of the present invention as defined by the appended claims.

What is claimed is:

1. A rotary electric machine, comprising:
   a frame having an air opening through which air flows;
   a stator core disposed to be supported in the frame, the stator core having a plurality of slots;
   a stator winding including a plurality of conductor segments each of which is formed into an approximate U-shape having a part of leg parts, the stator winding being inserted into the stator core through the slots to have both coil ends protruding from both ends of the stator core, respectively;
   a rotor disposed opposite to the stator core to be rotatable;
   a cooling fan for blowing air toward the both coil ends of the stator winding; and
   an elastic member disposed between the stator core and the frame to be inserted therebetween, wherein:
   the conductor segments are inserted into the slots of the stator core in such a manner that, the leg parts of each conductor segment penetrate through the slots from one end of the stator core to the other end thereof, and are connected at top ends; and
   the frame includes first and second frame parts separated in an axial direction of the rotor, the first and second frame parts being disposed to be fastened in the axial direction while press-contacting outer peripheral edge parts of the stator core through the elastic member.

2. The rotary electric machine according to claim 1, wherein:
   the elastic member includes first and second elastic parts each of which has an approximate L-shaped cross-section in the axial direction;
   the stator core has first and second outer peripheral edge parts in the axial direction;
   the first elastic part is inserted between an surface of the first outer peripheral edge part of the stator core and an surface of an inner corner part of the first frame part; and
   the second elastic part is inserted between an surface of the second outer peripheral edge part and an surface of an inner corner part of the second frame part.

3. The rotary electric machine according to claim 2, wherein:
   each of the first and second elastic parts includes an elastic portion made of an elastic material to have an approximate L-shaped cross-section, an inner portion made of a metal to have an approximate L-shaped cross-section corresponding to an inner side surface of the elastic portion, and an outer portion made of a metal to have an approximate L-shaped cross-section corresponding to an outer surface of the elastic portion; and
   the elastic portion, the inner portion and the outer portion are integrated.

4. The rotary electric machine according to claim 1, wherein:
   the elastic member includes first and second elastic parts each of which has an approximate L-shaped cross-section in the axial direction and in a radial inner side;
   the stator core has first and second cylindrical step parts recessed from outer peripheral edge parts in the axial direction and in the radial inner side;
   the first elastic part is inserted between an surface of the first step part and an inner peripheral end part of the first frame part; and
   the second elastic part is inserted between an surface of the second step part and an inner peripheral end part of the second frame part.

5. The rotary electric machine according to claim 4, wherein:
   each of the first and second elastic parts includes a elastic portion made of an elastic material to have an approximate L-shaped cross-section, an inner portion made of a metal to have an approximate L-shaped cross-section corresponding to an inner side surface of the elastic portion, and an outer portion made of a metal to have an approximate L-shaped cross-section corresponding to an outer surface of the elastic portion; and
   the elastic portion, the inner portion and the outer portion are integrated.

6. The rotary electric machine according to claim 1, wherein:
   the elastic member includes first and second elastic parts each of which has an approximate L-shaped cross-section in the axial direction;

the stator core has first and second outer peripheral edge parts in the axial direction;

the first elastic part is inserted between both surfaces of the first outer peripheral edge part of the stator core and both surfaces of an inner peripheral end part of the first frame part, and is disposed to be separated into plural elastic pieces at predetermined positions in a circumferential direction, each of the elastic pieces having an approximate circular arc shape; and the second elastic part is inserted between both surfaces of the second outer peripheral edge part of the stator core and both surfaces of an inner peripheral end part of the second frame part, and is disposed to be separated into plural elastic pieces at predetermined positions in a circumferential direction, each of the elastic pieces having an approximate circular arc shape.

7. The rotary electric machine according to claim 1, wherein the conductor segments are arranged to have a predetermined clearance between adjacent two thereof at the both coil ends of the stator winding, into which air blown by the cooling fan flows.

8. The rotary electric machine according to claim 2, wherein each of the first and second elastic parts has a ring shape around the stator core.

9. The rotary electric machine according to claim 1, wherein:

the elastic member is disposed between a stepped portion formed on one of the first and second frame parts and a corner portion of the stator core, the corner portion being located on a radial outside of an axial end of the stator core, and the elastic member is formed into an L-shaped cross-section having narrow radial width and narrow axial lenght, the radial width and the axial length being sufficient to expose the most part of the axial end and the radial outside of the stator core.

10. The rotary electric machine according to claim 9, wherein:

the elastic member includes an elastic portion made of elastic material and a pair of metal plate portions sandwiching the elastic portion therebetween, both of the metal plate portions being formed into an L-shaped cross-section respectively.

11. The rotary electric machine according to claim 10, wherein the elastic member is formed into a ring shape around the stator core.

12. The rotary electric machine according to claim 10, wherein the elastic member including a plurality of pieces each having an arc shape.

13. The rotary electric machine according to claim 9, wherein the elastic member is formed into a ring shape around the stator core.

14. The rotary electric machine according to claim 9, wherein:

the elastic member is provided as a first elastic member, and the rotary electric machine further comprises a second elastic member being disposed between a stepped portion formed on the other one of the first and second frame parts and the other corner portion of the stator core, the other corner portion being located on a radial outside of an axial end of the stator core opposite to the axial end on which the first elastic member is disposed, the second elastic member being formed into an L-shaped cross-section having narrow radial width and narrow axial length, the radial width and the axial length being sufficient to expose the most part of the axial end and the radial outside of the stator core.

15. The rotary electric machine according to claim 14, wherein:

each of the first and second elastic members includes an elastic portion made of elastic material and a pair of metal plate portions sandwiching the elastic portion therebetween, both of the metal plate portions being formed into an L-shaped cross-section respectively.

16. The rotary electric machine according to claim 15, wherein the elastic member is formed into a ring shape around the stator core.

17. The rotary electric machine according to claim 14, wherein each of the first and second elastic members including a plurality of pieces each having an arc shape.

18. The rotary electric machine according to claim 14, wherein each of the first and second elastic members is formed into a ring shape around the stator core.

19. The rotary electric machine according to claim 9, wherein the corner portion of the stator core is a right angled corner defined with the axial end and the radial outside of the stator core, the elastic member covering narrow area from the top of the corner portion.

20. The rotary electric machine according to claim 9, wherein the corner portion of the stator core is recessed with a right angled corner depressed from the axial end and the radial outside of the stator core, the elastic member covering the recessed area of the corner portion.

* * * * *